Patented July 6, 1937

2,086,184

UNITED STATES PATENT OFFICE 2,086,184

DOUGH MIX FOR BREAD

Louis W. Haas, Chicago, Ill., assignor to The W. E. Long Co., a corporation of Illinois No Drawing. Application April 13, 1931, Serial No. 529,787

4 Claims. (Cl. 99—90)

This invention relates to food products, and more particularly to bread and the process of manufacturing the same.

One of the objects of the invention is the provision of a new and improved bread, especially adapted for diabetic persons.

Another object of the invention is the provision of a new and improved process of mixing the ingredients and preparing the bread dough.

A further object of the invention is the provision of a new and improved bread that is not only especially adapted for diabetic persons but is also palatable and wholesome for general consumption, and has its ingredients combined according to the latest principles of nutrition.

A still further object of the invention is the provision of a new and improved bread that is especially adapted for the needs of the diabetic in that not only are the proper proportionate amounts of the ingredients of the bread employed, but those ingredients are selected as to quality as well as quantity.

Another object of the invention is the provision of a new and improved bread that is palatable, its constituents dietetically well balanced, and that may be prepared at a reasonable expense.

Other and further objects and advantages of the invention will appear from the following description.

The diabetic breads now commonly obtainable on the market are gluten bread and soy bean bread, neither of which is very desirable. The chief consideration in their production is a high protein and low carbohydrate content. The actual nutritive deficiencies of these products have apparently received little consideration.

Gluten bread is decidedly unpalatable. Its proteins are deficient in essential amino acids and their very high content of glutamic acid makes them highly glucogenic. The gliadin of wheat, which protein constitutes about two-thirds of the total protein of wheat and gluten breads, has a glucose yielding value of 80% of its weight in the processes of metabolism. It is obvious, therefore, that the sugar producing power of gluten bread is very high, in fact, not a great distance behind that of white bread. Thus the pronounced unpalatability of gluten bread, its biologically incomplete proteins, and the exceedingly high glucogenetic value of its proteins are all squarely arrayed against its value for the diabetic and its use is quite deceptive to the patient and most likely even injurious to the metabolic system.

The soy bean proteins would supplement, to some extent, the amino acid deficiencies of the wheat proteins and would also reduce the glucogenetic value of the total protein content. The proteins of animal origin, such as that of milk, eggs and meat have a high biological value, that is, they are well supplied with the indispensable amino acids which are so deficient in the proteins of vegetable origin. The quantity of the proteins employed is, therefore, not an adequate criterion of diet; the quality of the proteins must also be considered. In the present invention it is proposed to use proteins of both vegetable and animal origin whereby the indispensable amino acids (cystine, histidine, tryptophane, lysine, tyrosine, arginine, phenylalanine, proline and glutamic acid) deficient in the proteins of vegetable origin, will be present in the bread in adequate amounts for tissue building and repairing material. Furthermore, the protein constituents of the bread will have a minimum glucose yielding value, being from 25% to 30% lower in this respect, on the basis of weight for weight, than the proteins of gluten breads, which may yield as high as 80% of their weight in glucose.

The diabetic must consume the proper amount of fat, which is higher than the quantity required for the normal individual. In the normal diet fat furnishes less than one third of the total calories, but in the case of the diabetic, seldom less than one half of the caloric value of his diet is made up of fat. There is no diatetic reason, therefore, against a high percentage of shortening (fat) in diabetic bread. In fact, it would seem advisable to load diabetic bread to the limit with fat. Most of the special nut preparations which have appeared from time to time have run quite high in fat, but the cost of these products prohibits their general use and they cannot fill the place of a suitable bread in the dietary.

A diabetic bread which possesses all the desirable properties as to quantity and quality of nutriments and which, at the same time, has an agreeable flavor and is well tolerated by most sensitive diabetics, is prepared by using a mixture of cereal products with milk and milk derivatives, egg, soy bean flour, yeast, fat, salt and the necessary quantity of water.

I have found that the proper balance of the ingredients for a nutritiously complete diabetic bread may be obtained by blending with 200 parts of gluten flour 100 to 150 parts of soy bean flour (on the basis of full fat content) 50 to 100 parts of whole wheat flour, 10 to 15 parts of edible casein, 25 parts of skimmed milk (or equivalent), none to 20 parts of edible bran, none to 40 parts of whole rye or oat flour, none to 15 parts of edible fat, 50 parts of whole egg (or equivalent), 7 parts of salt together with suitable quantities of yeast, yeast food and water. The milk and eggs may be and preferably are desiccated. Typical formulae which will give the desired results, are as follows:

|  | Mix 1 | Mix 2 | Mix 3 | Mix 4 |
|---|---|---|---|---|
| Gluten flour | 200 | 200 | 200 | 200 |
| Soy bean flour | 150 | 150 | 125 | 100 |
| Whole wheat flour | 50 | 50 | 50 | 100 |
| Casein | 10 | 10 | 15 | 10 |
| Dry milk, skim | 25 | 25 | 25 | 25 |
| Edible bran |  | 20 | 20 |  |
| Oat flour |  |  | 40 |  |
| Fat |  |  | 8 | 15 |
| Egg, whole | 50 | 50 | 50 | 50 |
| Salt | 7 | 7 | 7 | 7 |
| Yeast, compressed | 20 | 20 | 20 | 20 |
| Yeast food, optional | 2 | 2 | 2 | 2 |
| Water | 300 | 315 | 380 | 300 |

Slight variations in the proportions of ingredients is permissible without deviating from the object of the invention. Further, substitutions of whole wheat flour by whole grain flour of other cereals are tolerable, and egg and milk products may be used in different form but in equivalent quantities.

Whole wheat and gluten flour are the preferred cereal products used, although a small quantity of either may be substituted by edible wheat bran and whole rye or oat flour. Suitable milk products are fluid or dry whole or skimmed milk and edible casein. Shell or frozen egg or dry egg or mixtures of white and yolk in proper relative proportions are suitable for this bread.

As shortening any edible fat may be used, such as butter, lard, compounds (vegetable or animal or mixed), and fully hydrogenated animal or vegetable shortenings.

Suitable soy bean preparations are the flour from the raw or slightly roasted or steamed bean (with or without partial or complete removal of the fat). For a light colored inside of the bread the flour from unroasted beans must be used, while from a standpoint of flavor flour from lightly roasted or steam treated beans is preferable.

The ingredients may be mixed in the usual or any well known manner. The following method of manufacturing the bread is, however, preferred. All the ingredients except the liquid constituent and the yeast are mixed in advance. When it is desired to prepare the dough the dry mixture is placed in a mixing machine with the liquid, such as water, and the yeast. The whole is then thoroughly mixed, care being taken to maintain the dough in a warm condition and to discharge the same from the mixer at from 83 to 85 degrees F.

The mixing operation takes longer than that of ordinary dough because the gluten flour takes liquid slower than ordinary bread flour. Immediately after it is discharged from the mixer it is divided and moulded and panned, thereby eliminating the usual fermentation period. This method not only speeds up the manufacture of the bread by this elimination, but it has been found to be superior to other fermentation treatments.

The panned loaves may be proofed as regular bread, but they should be baked at a temperature not exceeding 400 deg. F.

The nutritive value of the bread, from the standpoint of all-round efficiency, is exceedingly high. The various proteins used are properly balance and contain the indispensable amino acids in adequate amounts to meet the needs of the body. It is well supplied with vitamins A and B and contains a fair amount of G and some of E. The high calcium and phosphorus content of the bread imparts to it a high antirachitic potency which makes it of especial value to growing children whether they are diabetic or not. Adequate calcium and phosphorus are also very essential in adult nutrition from numerous viewpoints for these are the very two mineral elements most commonly lacking in the American and certain European dietaries. The bread toasts nicely and has a good grain and texture. By omitting all added shortening this bread would be much less fattening than ordinary white bread, and because of its superior nutritive value it would constitute for the more or less obese, but non-diabetic population, an all-round, efficient, health bread.

I claim as my invention:

1. A dough mix adapted when baked to produce a bread in loaves of commercial size that is comparable to ordinary cereal flour bread in porosity, texture and palatability and which, unlike such bread, is low in carbohydrates and balanced in quality of proteins and hence is acceptable in the diabetic diet, said mix comprising as its principal ingredients, aside from the water, flour consisting of soy bean, gluten and whole wheat flours, comprising respectively substantially three-eighths to one-third, one-half and one-eighth of the entire flour content, and animal proteins including skim milk, eggs and casein to balance the vegetable proteins contained in said flour, and salt, yeast and water.

2. A food product consisting of gluten flour approximately 200 parts, soy bean flour 100 to 150 parts, whole wheat flour from 50 to 100 parts, casein from 10 to 15 parts, dry skim milk approximately 25 parts, edible bran from none to 20 parts, oat flour from none to 40 parts, fat from none to 15 parts, eggs approximately 50 parts, salt approximately 7 parts, yeast approximately 20 parts, and water approximately 300 parts.

3. A bread composition for diabetics comprising soy bean flour and gluten flour together constituting more than one-half of the composition aside from the water, the amount of soy bean flour being not substantially less than one-half or substantially greater than three-fourths the amount of gluten flour, whole wheat flour to the extent of approximately one-seventh of the amount of gluten and soy bean flours, and materials containing animal proteins, said materials being in amounts not less than ten per cent of the mass aside from the water, yeast, salt and water.

4. A bread composition for diabetics comprising soy bean flour, gluten flour, whole wheat flour constituting substantially three-fifths of the mass aside from the water and being all of the flour used in the composition, the amount of soy bean flour being at least twice as much as the whole wheat flour and substantially from one-half to three-fourths as much as the gluten flour, casein, milk, eggs, yeast, salt and water.

LOUIS W. HAAS